United States Patent Office 3,193,523
Patented July 6, 1965

3,193,523
STABILIZATION OF POLYESTERS WITH
SUBSTITUTED CARBODIIMIDES
Wolfram Neumann, Leverkusen, Hans Holtschmidt and Wilhelm Kallert, Cologne-Stammheim, and Artur Reischl, Leverkusen, all of Germany, assignors to Farbenfabriken Bayer Aktiengesellschaft, Leverkusen, Germany, a corporation of Germany
No Drawing. Filed Dec. 27, 1961, Ser. No. 162,589
Claims priority, application Germany, Dec. 31, 1960, F 32,877
13 Claims. (Cl. 260—45.9)

This invention relates to esters stabilized against hydrolysis and ageing and more particularly to compounds containing a plurality of ester groups, for example, polyesters stabilized against hydrolysis and ageing.

It has been heretofore known to use polycarbodiimides as stabilizers against the hydrolytic splitting of synthetic resins having a polyester base. The carbodiimides described for this purpose, such as, dicyclohexyl carbodiimide, methyl tertiary butyl carbodiimide and tetra-ethylene-ω,ω'-bis-tertiary butyl carbodiimide, are substances which show a tendency to polymerize because of their structure, so that reactivity of the carbodiimide group, and thus their stabilizing action, is at least partially destroyed. Further, when these carbodiimides are used as stabilizers in polyesters which are used to produce polyurethanes by the polyisocyanate-active hydrogen route, they cause an undesirably large acceleration of this reaction, thus making satisfactory processing difficult. Further, carbodiimides have a tendency to form addition compounds with isocyanates such as uretonimines and trimerization products of varying quantities of carbodiimide and isocyanate. These side reactions of the carbodiimide and isocyanate further reduce the quantity of the effective carbodiimide groups present, thereby further reducing the stabilization against hydrolysis and ageing. Carbodiimides having functional groups such as hydroxyl groups have also been known in the art as stabilizers, however, such compounds will react with each other, thereby reducing the stabilization action of the compounds. Further, the storage capacity of these compounds is limited and they are obtainable only with great difficulty.

It has also been proposed to use polycarbodiimides having more than three carbodiimide groups and a molecular weight greater than 500 as stabilizers for compositions containing ester groups. While this process is an improvement over that set forth above in that the useful life of the polyester is increased, these compounds are difficult to purify while it is desirable to have pure, catalyst-free crystals or definitely boiling liquids as stabilizers.

It is therefore an object of this invention to stabilize esters against hydrolysis and ageing. It is another object of this invention to provide a method of stabilizing polyesters against hydrolysis and ageing. It is still another object of this invention to stabilize resinous materials having polyester residues against hydrolysis and ageing.

The foregoing objects and others which will become apparent from the following description are accomplished in accordance with this invention, generally speaking, by stabilizing compositions containing ester groups by the addition of an aromatic or cycloaliphatic monocarbodiimide which is substituted at least in the 2 and 2' position. Thus, the invention contemplates the stabilization of polyesters having repeating ester linkages in the chain by incorporating therein an aromatic or cycloaliphatic monocarbodiimide which is substituted in at least the 2 and 2' position with an alkyl group having from 1 to 18 carbon atoms such as, for example, methyl, ethyl, propyl, isopropyl, butyl, isobutyl, dodecyl, octadecyl, allyl, crotyl, oleyl and the like; aralkyl groups such as, for example, benzyl, β-phenyl ethyl, xylyl and the like; aryl groups such as, for example, phenyl, tolyl, naphthyl and the like; alkoxy groups with alkyl residues having from 1 to 18 carbon atoms such as, for example, methoxy, ethoxy, butoxy and the like; halogen atoms such as, for example, chlorine, bromine, fluorine, iodine and the like; nitro groups; carbalkoxy groups such as, for example, carbomethoxy, carbethoxy and the like; cyano groups and the like. Of course, the monocarbodiimide may contain substituents other than the aforementioned types on the aromatic or cycloaliphatic ring. Especially suited are those carbodiimides which are tetra-substituted on the aromatic or cycloaliphatic ring in the 2,2' and 6,6' positions. The most preferred are the 2,2' and 6,6' substituted aromatic or cycloaliphatic monocarbodiimides wherein the substituent is alkyl or alkoxy. All these compounds within the general description set forth have been found to stabilize compounds containing ester groups against hydrolysis and ageing.

These monocarbodiimide groups can be prepared in the manner known in the art such as, for example, by the desulferization of the correspondingly substituted thioureas with heavy metal oxides or with alkalines sodium hypochloride solution or they can be prepared in accordance with U.S. Patents 2,853,473 or 2,853,518 by reacting an isocyanate with a phospholine or phospholidine or oxides or sulphides thereof. Suitable carbodiimides can also be prepared according to the procedure set forth in copending application Serial No. 110,651 by reacting an aromatic monoisocyanate which carries one or two aryl, alkyl, aralkyl or alkoxy substituent in the o-position to the —NCO groups where at least one of the substituents has at least two carbon atoms, the reaction being conducted in the presence of a tertiary amine, a partially reacting metal compound, metal salts of carboxylic acids or nonbasic organo metallic compounds. Any suitable carbodiimide which is at least substituted in the 2 and 2' position may be used in accordance with this invention to stabilize compositions containing ester groups such as, for example, 2,2'-dimethyl-diphenyl carbodiimide,
2,2'-diisopropyl-diphenyl carbodiimide,
2-dodecyl-2'-n-propyl-diphenylcarbodiimide,
2,2'-diethoxy-diphenyl carbodiimide,
2-O-dodecyl-2'-O-ethyl-diphenylcarbodiimide,
2,2'-dichloro-diphenylcarbodiimide,
2,2'-ditolyl-diphenyl carbodiimide,
2,2'-dibenzyl-diphenyl carbodiimide,
2,2'-dinitro-diphenyl carbodiimide,
2-ethyl-2'-isopropyl-diphenyl carbodiimide,
2,6,2',6'-tetraethyl-diphenyl carbodiimide,
2,6,2',6'-tetra-secondary-butyl-diphenyl carbodiimide,
2,6,2',6'-tetraethyl-3,3'-dichloro-diphenyl carbodiimide,
2,6,2',6'-tetraisopropyl-3,3'-dinitro-diphenyl carbodiimide,
2-ethyl-cyclo hexyl-2-isopropyl-phenyl carbodiimide,
2,4,6,2',4',6'-hexaisopropyl-diphenyl carbodiimide,
2,2'-diethyl-dicyclohexyl carbodiimide,
2,6,2',6'-tetraisopropyl-dicyclohexyl carbodiimide,
2,6,2',6'-tetraisopropyl-dicyclohexyl carbodiimide,
2,6,2',6'-tetra-ethyl-dicyclohexyl carbodiimide and
2,2'-dichlorodicyclohexyl carbodiimide,
2,2'-dicarbethoxy diphenyl carbodiimide,
2,2'-dicyano-diphenyl carbodiimide and the like.

While it is contemplated that any amount of the carbodiimide may be incorporated to stabilize the ester containing compositions it is preferred that the carbodiimide component be used in a quantity of from about 0.1 to about 10% by weight of the composition.

It is possible to add the carbodiimide either to the starting components used in preparation of the ester, to an intermediate which may be used in the process of preparing the ester or, the carbodiimide may be added after the preparation of the ester is completed. In the event that the ester or polyester is used in further reactions with other compounds such as, for example, the reaction with an organic polyisocyanate to prepare polyurethanes, the carbodiimide can also be added after this reaction takes place. The addition can be made with the carbodiimides in the dissolved state by rolling, milling, stirring or any suitable technique.

Any composition containing repeating ester linkages

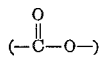

in the chain may be stabilized against hydrolytic degradation by the introduction of polycarbodiimides in accordance with this invention such as, for example, the reaction product of a carboxylic acid with an alcohol. Any suitable carboxylic acid may be used in the preparation of compositions containing ester groups in accordance with this invention such as, for example, acetic acid, propionic acid, phenyl acetic acid, benzoyl acetic acid, pyruvic acid, propionyl acetic acid, butyryl formic acid, aceto butyric acid, levulinic acid, 1,2-keto stearic acid, 1,3-keto behenic acid, aldovaleric acid, hexahydrobenzoic acid, 1,2-cyclohexanone carboxylic acid, brassylic acid, phenyl malonic acid, ethyl glycollic acid, thiodiglycollic acid, β-chloropropionic acid, glutaconic acid, ethoxymalonic acid, malic acid, aspartic acid, acrylic acid, methacrylic acid, cinnamic acid, benzene tricarboxylic acid, adipic acid, succinic acid, suberic acid, sebacic acid, oxalic acid, methyladipic acid, glutaric acid, pimelic acid, azelaic acid, phthalic acid, terephthalic acid, isophthalic acid, thiodipropionic acid, maleic acid, fumaric acid, citraconic acid, itaconic acid and the like.

Any suitable alcohol may be used such as, for example, methyl alcohol, ethyl alcohol, propyl alcohol, isopropyl alcohol, n-butyl alcohol, isobutyl alcohol, secondary butyl alcohol, tertiary butyl alcohol, amyl alcohol, hexyl alcohol, octyl alcohol, decyl alcohol, lauryl alcohol, myristyl alcohol, cetyl alcohol, stearyl alcohol, allyl alcohol, methallyl alcohol, crotyl alcohol, 2-propyn-1-ol, oleyl alcohol, geraniol, citronellol, linalool, diacetone alcohol, ethylene glycol monoethyl ether, cyclohexanol, naphthenic alcohols, benzyl alcohol, tolyl alcohol, phenyl ethyl alcohol, octadecylbenzyl alcohol, ethylene glycol, propylene glycol, 1,4-butanediol, 1,3-butanediol, 1,5-pentanediol, 1,6-hexanediol, bis-(hydroxy methyl chlorohexane), diethylene glycol, 2,2-dimethyl propylene glycol, 1,3,6-hexane triol, trimethylol propane, pentaerythritol, sorbitol, glycerine and the like. The method of stabilizing compositions containing ester groups is applicable not only to monoesters but also to polyesters in accordance with the compounds listed above having a functionality greater than 1. For example, where any of the di- or polycarboxylic acids are reacted with the di- or polyhydric alcohols, a polyester having more than 1 ester group, of course, will result. The stabilization of the composition containing ester groups against hydrolysis increases as the number of ester groups in the molecule increases.

Of course, other compositions containing polyester resins as a reaction component or in admixture can also be stabilized by the process of this invention. For example, compositions such as polyester amides and polyester urethanes can be stabilized. The reaction product of any of the carboxy terminated or hydroxyl terminated esters set forth above can be reacted with a suitable isocyanate to prepare a polyurethane. In the preparation of polyesteramides, the reaction of a carboxylic acid, an alcohol and an amine can be carried out simultaneously or in steps in the manner set forth for the preparation of polyesteramides. Of course, aminoalcohols and aminoacids can be used in the preparation of polyesteramides. The pertinent feature is, however, that any composition containing ester groups can be stabilized against hydrolysis by the introduction thereto of an aromatic or cycloaliphatic monocarbodiimide which is substituted at least in the 2 and 2' position. The carbodiimide group referred to, of course, is a radical having two nitrogen atoms connected to a carbon atom by double bonds

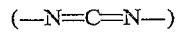

Any suitable polyisocyanate can be used in the preparation of polyester urethane by reaction with a polyester such as any of those set forth below for use in preparing the polycarbodiimides.

Any suitable amino compound can be used to prepare polyesteramides such as, for example, hexamethylene diamine, ethylene diamine, propylene diamine, butylene diamine, cyclohexyl diamine, phenylene diamine, tolylene diamine, xylylene diamine, 4,4'-diamino-diphenylmethane, naphthylene diamine, aminoethyl alcohol, aminopropyl alcohol, aminobutyl alcohol, aminobenzyl alcohol, aminoacetic acid, aminopropionic acid, aminobutyric acid, aminovaleric acid, aminophthalic acid, aminobenzoic acid, and the like. Of course, the amino compounds may be reacted either simultaneously with the ester forming components or sequentially therewith.

It is also within the scope of this invention that naturally occurring esters may be stabilized against hydrolysis and ageing in accordance with this invention such as, for example, castor oil, cocoanut oil, corn oil, cottonseed oil, horse fat oil, lard oil, wool fat, japan wax, mutton tallow, beef tallow, neat's-foot oil, palm oil, peanut oil, carnauba wax, spermaceti, beeswax, rapeseed oil, soya bean oil, whale oil, sperm oil and the like. Further, any compositions containing ester groups as well as unsaturation may be stabilized in accordance with this invention. Such compositions may be formed by polymerization, condensation or a combination of both. Any of those unsaturated carboxylic acids mentioned above may be used in the preparation of such polyesters. Further examples of such compositions include polyester resins of polymerizable monomers and unsaturated polyesters, for example, those of fumaric or maleic acid as well as ethylene vinyl ester copolymers, acrylic and methacrylic acid ester polymers and their copolymers with vinyl esters, fluorinated acrylic esters and their copolymers, copolymers of acrylonitrile and acrylic acid esters such as methylacrylate and the like. The invention is particularly applicable to the stabilization of polyesters used in the manufacture of synthetic resins which may result in the form of lacquers, foils, coatings, fibers, foam materials, elastomers or casting resins for molded elements.

The stabilization of ester containing compositions in accordance with this invention is advantageous for the reason that the monocarbodiimides show an increased effectiveness since they do not polymerize with themselves, they are useful in polyesters used in reaction with polyisocyanates to produce polyurethanes for the reason that they do not accelerate the polyaddition reaction and they do not enter into reaction with the isocyanates to thereby reduce the number of carbodiimide groups present.

The invention and its advantages over the prior art will be further illustrated by the following examples in which parts are by weight unless otherwise specified.

COMPARISON EXAMPLE (a) About 100 parts of a polyester prepared from about 175 parts of adipic acid, about 128 prats of diethylene glycol and about 8 parts of trimethylol propane are dried in vacuo at about 140° C. while stirring. The temperature is then allowed to fall to about 100° C. and about 6.5 parts by weight of toluylene diisocyanate are admixed therewith. The temperature rises, without further supply of heat and within about 10 minutes to about 110° C. At this time, the still liquid melt is poured into preheated and waxed molds and heated in a heating chamber for about 4 hours at about 110° C. The time available for casting is about 30 minutes, that is, for this period of time, the mixture is of low viscosity and enclosed air bubbles can readily escape. The material can then be removed from the molds and is kept for another 20 minutes at the same temperature. After cooling, the product constitutes a soft gelatin-like mass, which can be very satisfactorily used as a material for printing cylinders.

(b) When about 2 parts of dicyclohexyl carbodiimide are added to the polyester before adding the toluylene diisocyanate as in (a), the temperature of the reaction mixture rises within about 3 minutes to about 113° C. because of the reaction-accelerating effect of the dicyclohexyl carbodiimide. The mixture is of relatively high viscosity. Test elements to determine ageing can be cast directly, but a printing cylinder with a height of about 400 mm. and a diameter of about 45 mm. is not suitable because it contains a number of small air bubbles inside the composition and on the surface which prohibit the use of this roller for high quality printing operations.

(c) When about 2 parts of diisopropyl carbodiimide are used for stabilization purposes, there is a rise in temperature of about 112° C. within about 4 minutes. A composition is obtained which cannot be cast in an entirely satisfactory manner. A printing cylinder with the dimensions indicated above again contains a number of air bubbles.

*Example 1*

A reaction mixture prepared as in the comparison experiment, but using about 2 parts of 2,6,2',6'-tetraethyl-diphenyl carbodiimide rises to a temperature of about 109° C. in about 11 minutes. It yields a melt which can be cast and the viscosity of which is practically the same as that of the mixture described under (a). The test mold for a printing cylinder as well as other molds for test elements can be filled with bubble-free material in about 28 minutes.

Cylindrical test elements with a height of about 10 mm. and a diameter of about 25 mm. are stored at about 80° C. and about 95% air humidity. In each case after cooling for about 1 hour, the decrease in Shore hardness of the specimen is determined every 24 hours as a standard for the mechanical compressive strength.

The tests for ageing on the above examples give the following results:

(a)

| Days | 0 | 1 | 2 | 3 | 4 | 5 | |
|---|---|---|---|---|---|---|---|
| Shore decrease | 19 | 15 | 10 | 6 | 2 | 0 | (Specimen deliquesces.) |

Shore hardness decrease per day: 3.8.

(b)

| Days | 0 | 1 | 2 | 3 | 4 | 5 | 6 | 7 | 8 | 9 | |
|---|---|---|---|---|---|---|---|---|---|---|---|
| Shore decrease | 19 | 17 | 15 | 13 | 11 | 9 | 6 | 4 | 1 | 0 | (Specimen deliquesces.) |

Shore hardness decrease per day: 2.1.

(c)

| Days | 0 | 1 | 2 | 3 | 4 | 5 | 6 | 7 | 8 | 9 | 10 | |
|---|---|---|---|---|---|---|---|---|---|---|---|---|
| Shore decrease | 20 | 18 | 16 | 14 | 12 | 10 | 8 | 6 | 4 | 2 | 0 | (Specimen deliquesces.) |

Shore hardness decrease per day: 2.0.

*Example 1*

| Days | 0 | 3 | 6 | 9 | 12 | 15 | 18 | 21 | 24 | 27 | 30 | 33 | 36 | 39 | |
|---|---|---|---|---|---|---|---|---|---|---|---|---|---|---|---|
| Shore decrease | 18 | 17 | 16 | 14 | 13 | 11 | 10 | 9 | 7 | 6 | 4 | 2 | 1 | 0 | (Specimen deliquesces.) |

Shore hardness decrease per day: 0.46.

*Example 2*

A mixture of 392 parts of maleic anhydride and 335 parts of propylene glycol is heated at about 200° C. for about 4 hours while passing a slow stream of carbon dioxide through the stirred reaction mixture. The reaction is then continued for about 1.5 hours under reduced pressure of less than 50 mm. After a total reaction time of 6 hours an alkyd having an acid number of 9 results. To 100 parts of this alkyd resin is added 5 parts of 2,2'-dimethyl-diphenyl carbodiimide. The hydrolysis resistance of this material is increased due to the action of the carbodiimide.

*Example 3*

200 parts of a polyester prepared from ethylene glycol and adipic acid (OH-number 56; acid number 1) are heated while stirring 30 minutes to 130–140° /12 torr. Without further heating 60 parts of 1.5-naphthylene diisocyanate are added under atmospheric pressure. When the diisocyanate is dissolved 4 parts of 2,2',6,6'-tetraisopropyl-diphenyl carbodiimide are added. After 10 to 15 minutes 14 parts of 1,4-butane diol are stirred into the melt at 125° C. and then the reaction product is poured into hot molds. To complete the reaction the moldings are heated to 110° C. for 24 hours.

| Aging in days at 70° C./95% humidity | 0 | 14 |
|---|---|---|
| Shore-hardness A | 93 | 95 |
| Tensile strength, kg./cm.² | 294 | 194 |
| Breaking elongation, percent | 550 | 525 |
| Permanent elongation, percent | 37 | 63 |

*Example 4*

The elastomer is prepared as in Example 3. 2 parts of 2,2',6,6'-tetraethyl-diphenyl carbodiimide are employed instead of 4 parts of 2,2',6,6'-tetraisopropyl-diphenyl carbodiimide. The stabilized elastomer has the following properties:

| Aging in days at 70° C./95% humidity | 0 | 14 |
|---|---|---|
| Shore-hardness A | 93 | 90 |
| Tensile strength, kg./cm.² | 330 | 345 |
| Breaking elongation, percent | 485 | 550 |
| Permanent elongation, percent | 15 | 45 |

Comparison example to Examples 2 and 3 but without the addition of carbodiimide:

| Aging in days at 70° C./95% humidity | 0 | 14 |
|---|---|---|
| Shore-hardness A | 94 | 95 |
| Tensile strength, kg./cm.² | 270 | 74 |
| Breaking elongation, percent | 450 | 80 |
| Permanent elongation, percent | 45 | 4 |

*Example 5*

A polyurethane mass is prepared from an adipic acid-ethylene glycol-propylene glycol-polyester (the ethylene glycol and the 1,2-propylene glycol being in a ratio of 70:30; OH-number of the polyester 60) and the equivalent amount of 4,4'-diphenylmethane diisocyanate. The mass is reacted until a Mooney plasticity of 40 to 50 at 100° C. is reached. The mass is mixed on a roller with the following substances:

| | | | |
|---|---|---|---|
| Polyurethane mass | 100 | 100 | 100 |
| Stearic acid | 0.75 | 0.75 | 0.75 |
| Finely divided siliceous earth | 20 | 20 | 20 |
| Tertiary butyl-cumyl peroxide | 3 | 3 | 3 |
| Triallyl cyanurate | 1 | 1 | 1 |
| Dicyclohexyl carbodiimide | | 4 | |
| 2,6,2',6'-tetraethyl-4,4'-dimethyl diphenyl carbodiimide | | | 4 |

Test-plates are vulcanized for 10 minutes at 172° C.

in a press. They exhibit when aged in hot water the following mechanical properties:

| O-value | | | |
|---|---|---|---|
| Tensile strength (kg./cm.²) | 243 | 225 | 203 |
| Elongation | 430 | 480 | 555 |
| After 1 day | | | |
| T | 260 | 240 | 254 |
| E | 510 | 550 | 660 |
| After 2 days | | | |
| T | 117 | 150 | 170 |
| E | 450 | 600 | 620 |
| After 3 days | | | |
| T | 57 | 90 | 135 |
| E | 585 | 600 | 575 |
| After 4 days | | | |
| T | 10 | 50 | 108 |
| E | 680 | 760 | 615 |
| After 5 days | | | |
| T | Destroyed | 22 | 105 |
| E | | 650 | 640 |
| After 6 days | | | |
| T | Destroyed | Destroyed | 86 |
| E | | | 730 |

Example 6

In a mixing container the following mixture based on an ethylene-vinyl acetate-copolymer is prepared:

| | | |
|---|---|---|
| Ethylene-vinyl acetate-copolymer with 45% acetate | 100 | 100 |
| Stearic acid | 1 | 1 |
| Finely divided siliceous earth | 30 | 30 |
| Dicumyl peroxide | 2.5 | 2.5 |
| Triallyl phosphate | 4 | 4 |
| 2,6,2',6'-tetraethyl-4,4'-dimethyldiphenyl carbodiimide | | 4 |

Test-plates having been vulcanized for 30 minutes at 151° C. exhibit after ageing at 200° C. the following properties:

| O-value | | |
|---|---|---|
| Tensile strength (kg./cm.²) | 189 | 185 |
| Elongation | 355 | 420 |
| After 1 day | | |
| T | 47 | 152 |
| E | 110 | 300 |
| After 2 days | | |
| T | 30 | 129 |
| E | 45 | 290 |
| After 3 days | | |
| T | 12 | 80 |
| E | 20 | 170 |
| After 4 days | | |
| T | Destroyed | 32 |
| E | | 45 |

Example 7

On a mixing roller the following mixture is melt:

| | | |
|---|---|---|
| Polyacryl acid ethyl ester Mooney plasticity (ML 4', 100° C:60) | 100 | 100 |
| Stearic acid | 1 | 1 |
| Carbon black | 50 | 50 |
| Dicumylperoxide | 3.2 | 3.2 |
| Triallyl cyanurate | 4.0 | 4.0 |
| 2,6,2',6'-tetraethyl-3,3'-dichlorodiphenyl carbodiimide | | 3 |

The resulting slabs are pressed for 45 minutes at 151° C., then exhibiting the following mechanical properties:

| | | |
|---|---|---|
| Tensile strength (kg./cm.²) | 77 | 79 |
| Elongation (percent) | 260 | 245 |
| Shore-hardness: Room temperature; 75° | 55; 46 | 54; 45 |
| Re-bound elasticity (percent): Room temperature, 75° | 9; 22 | 9; 21 |
| A compression set DIN 53 572 (ASTM percent): | | |
| 22 h./70° | 13 | 14 |
| 70 h./100° | 37 | 39 |

When being aged in hot air the vulcanisate stabilized with carbodiimide exhibits a four times longer life-time.

Example 8

A melt of polyvinyl acetate (molecular weight about 75,000) is combined at 70° with 3% 2,4,6,2',4',6'-hexaisopropyl-diphenyl carbodiimide. The polyvinyl acetate thus stabilized shows a considerably increased resistance against saponification and thermal stress as compared with unstabilized materials.

It can readily be seen that the substituted monocarbodiimides have a pronounced stabilizing action on composition containing ester groups. Any of the substituted monocarbodiimides set forth above may be used in the working examples in place of those used therein. Also any composition containing ester groups can be used throughout the examples in place of those specifically used therein.

Although the invention has been described in considerable detail for the purpose of illustration, it is to be understood that variations can be made by those skilled in the art without departing from the spirit of the invention and scope of the claims.

What is claimed is:

1. A polyester stabilized against hydrolysis and ageing said polyester having repeating ester linkages in the chain by incorporation therein of a stabilizing amount of a monocarbodiimide substituted at least in the 2 and 2' position selected from the group consisting of phenyl monocarbodiimides and cyclohexyl monocarbodiimides, said substituent being selected from the radicals consisting of alkyl having from 1 to 18 carbon atoms, aralkyl, aryl, alkoxy having 1 to 18 carbon atoms, halogen, nitro, carbomethoxy, carbethoxy and cyano.

2. A stabilized polyester having repeating ester linkages in the chain containing from about 0.1 percent to about 10 percent by weight of a 2,2'-dialkyl diphenyl carbodiimide, said alkyl radicals having from 1 to 18 carbon atoms.

3. A stabilized polyester having repeating ester linkages in the chain containing from about 0.1 percent to about 10 percent by weight of a 2,2'-dialkyl dicyclohexyl carbodiimide, said alkyl radicals having from 1 to 18 carbon atoms.

4. A stabilized polyester having repeating ester linkages in the chain containing from about 0.1 percent to about 10 percent by weight of a 2,2'-dialkoxy diphenyl carbodiimide, said alkoxy radicals having from 1 to 18 carbon atoms.

5. A stabilized polyester having repeating ester linkages in the chain containing from about 0.1 percent to about 10 percent by weight of a 2,2'-dialkoxy dicyclohexyl carbodiimide, said alkoxy radicals having from 1 to 18 carbon atoms.

6. A stabilized polyester having repeating ester linkages in the chain having incorporated therein 2,2',6,6'-tetraisopropyl-diphenyl carbodiimide.

7. A polyester stabilized against hydrolysis and ageing, said polyester having repeating ester linkages in the chain, by incorporation therein of a stabilizing amount of a phenyl monocarbodiimide substituted at least in the 2 and 2' position with a radical selected from the group consisting of alkyl having from 1 to 18 carbon atoms, aralkyl, aryl, alkoxy having 1 to 18 carbon atoms, halogen, nitro, carbomethoxy, carbethoxy, and cyano.

8. A polyester stabilized against hydrolysis and ageing, said polyester having repeating ester linkages in the chain, by incorporation therein of a stabilizing amount of a cyclohexyl carbodiimide substituted at least in the 2 and 2' position with a radical selected from the group consisting of alkyl having from 1 to 18 carbon atoms, aralkyl, aryl, alkoxy having 1 to 18 carbon atoms, halogen, nitro, carbomethoxy, carbethoxy, and cyano.

9. A polyester stabilized against hydrolysis and ageing, said polyester having repeating ester linkages in the chain, by incorporation therein of a stabilizing amount of a monocarbodiimide tetra-substituted in the 2, 2' and 6,6' positions, said monocarbodiimide being selected from the group consisting of phenyl monocarbodiimides and cyclohexyl monocarbodiimides, said substituent being selected from the radicals consisting of alkyl having from 1 to 18 carbon atoms, aralkyl, aryl, alkoxy having 1 to 18 carbon atoms, halogen, nitro, carbomethoxy, carbethoxy, and cyano.

10. A polyester stabilized against hydrolysis and ageing, said polyester having repeating ester linkages in the chain, by incorporation of a stabilizing amount of a phenyl monocarbodiimide substituted at least in the 2 and 2' position with an alkyl radical having 1 to 18 carbon atoms.

11. A polyester stabilized against hydrolysis and ageing, said polyester having repeating ester linkages in the chain, by incorporation of a stabilizing amount of a phenyl monocarbodiimide substituted at least in the 2 and 2' position with an alkoxy radical having 1 to 18 carbon atoms.

12. A polyester stabilized against hydrolysis and ageing, said polyester having repeating ester linkages in the chain, by incorporation of a stabilizing amount of a cyclohexyl monocarbodiimide substituted at least in the 2 and 2' position with an alkyl radical having 1 to 18 carbon atoms.

13. A polyester stabilized against hydrolysis and ageing, said polyester having repeating ester linkages in the chain, by incorporation of a stabilizing amount of a cyclohexyl monocarbodiimide substituted at least in the 2 and 2' position with an alkoxy radical having 1 to 18 carbon atoms.

References Cited by the Examiner
UNITED STATES PATENTS

| | | | |
|---|---|---|---|
| 2,415,043 | 1/47 | Rust | 260—45.9 |
| 2,654,680 | 10/53 | Goppel et all. | 260—45.9 |
| 2,853,473 | 9/58 | Campbell et al. | 260—45.9 |
| 2,937,164 | 5/60 | Brown et al. | 260—45.9 |

LEON J. BERCOVITZ, *Primary Examiner.*

ALPHONSO D. SULLIVAN, DONALD E. CZAJA,
*Examiners.*